Patented Mar. 27, 1951

2,546,159

UNITED STATES PATENT OFFICE 2,546,159

PIPERIDYL KETONES AND PROCESS OF MAKING SAME

Hans Kaegi, Basel, and Karl Miescher, Riehen, Switzerland, assignors to Ciba Pharmaceutical Products, Inc., Summit, N. J.

No Drawing. Application March 28, 1946, Serial No. 657,897. In Switzerland April 10, 1945

16 Claims. (Cl. 260—294.3)

This invention relates to piperidyl ketones which correspond to the formula

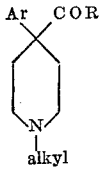

wherein Ar stands for a phenyl or naphthyl radical and R stands for an alkyl or aralkyl radical, and to the preparation thereof.

According to this invention, piperidyl ketones are produced by reacting a piperidyl acid halide with a compound containing an active methylene group or with a metal salt of such compound, and if desired subjecting the resultant condensation product to further reaction while retaining the newly-formed keto group.

Preferred, as initial piperidyl acid halides, are tertiary or quaternary 4-aryl-piperidine-4-carboxylic acid halides, preferably in the form of their salts, wherein the aryl group is a phenyl or naphthyl radical which may be substituted by esterified or etherified hydroxyl groups. Illustrative of suitable piperidyl acid halides are: 1-methyl-4-phenyl-piperidine - 4 - carboxylic acid chloride, 1 - methyl - 4 - (m - methoxyphenyl) - piperidine-4-carboxylic acid chloride, 1 methyl-4-(o:m-dimethoxyphenyl) - piperidine - 4 - carboxylic acid chloride, 1-methyl-4-(m-acetoxyphenyl)-piperidine-4-carboxylic acid chloride, 1-ethyl - 4 - naphthyl - piperidine - 4 - carboxylic acid bromide. These are employed preferably as their salts, such as the hydrohalides, for example hydrochloride or hydrobromide, or in the form of their alkyl- or aralkyl-halide quaternary piperidinium salts such as the methochloride, methobromide, benzochloride and the like. Illustrative of the latter are 1-methyl-4-phenyl-piperidine-4-carboxylic acid chloride-methochloride, 1-methyl-4-phenyl-piperidine-4-carboxylic acid chloride-benzochloride, 1-methyl-4 - (m-methoxyphenyl)-piperidine-4 - carboxylic acid chloride-methobromide, 1-methyl-4-(o - methoxyphenyl)-piperidine-4-carboxylic acid chloride-methochloride, and 1-methyl-4-(o:m-dimethoxyphenyl) - piperidine - 4- carboxylic acid chloride-methochloride.

The tertiary piperidine carboxylic acid halides may be obtained from the corresponding acids by treatment with halides or oxyhalides of phosphorus or sulfur, or with phosgene or the like, preferably in an inert organic solvent. In analogous manner, the quaternary 4-aryl-piperidine-4-carboxylic acid halides may be obtained from the 4-aryl-piperidine-4-carboxylic acid betaines. The latter may be prepared according to the process set forth in the United States patent application Serial No. 592,536, filed May 7, 1945 (now U. S. Pat. No. 2,486,795).

As compounds which contain an active methylene group, that is contain at least one active hydrogen atom bound to a carbon atom, use may be made for example of compounds which contain in α-position, as the activating substituent, a carbonyl or carboxyl group or a substituent which is convertible into such a group, for instance by hydrolysis. Illustrative of such compounds are: α:α-dicarboxylic acid derivatives such as malonic ester, malonitrile and cyanacetic ester; β-ketocarboxylic acid derivatives such as acetoacetic ester, benzoylacetic ester and pyridoylacetic ester; mono-carboxylic acid derivatives such as acetic acid esters and benzyl cyanides, β-diketones such as acetyl-acetone, and the like. In the enumerated compounds, one hydrogen atom of the active methylene group may be replaced by a monovalent radical, for example an alkyl such as methyl, ethyl or propyl. It is desirable to use metal derivatives of these starting materials, such as the alkali metal or magnesium compounds. The enumerated acid chlorides may also be reacted with aliphatic diazo compounds, such as diazomethane, diazoethane, diazobutane, phenyl-diazomethane and ethyl diazoacetate.

The condensation is carried out preferably in an inert solvent, such as ether, isopropyl ether, petroleum ether or benzene. Depending upon the starting materials employed, the reaction may be carried out with cooling, at room temperature or at elevated temperature.

The resultant compounds may be further transformed if the requisite groups are present. Thus, a nitrile or esterified carboxyl group may be hydrolyzed and the resulting product decarboxylated; or a removable radical, such as benzyl, attached to the ring nitrogen may be split off; or esterified or etherified hydroxyl groups present in the aryl radical may be hydrolyzed. Diazoketones obtained may be converted into oxyketones, their esters or ethers. It is also possible to replace the diazo group by hydrogen, either directly or after replacement by halogen.

The 4-aryl-piperidyl-4-ketones of the present invention are valuable compounds. They may be used as medicaments or as intermediates.

The following examples are illustrative of the invention and are not to be regarded as limiting it in any way. Except as otherwise indicated, the parts mentioned are by weight.

Example 1

24 parts of malonic ester are stirred for about 20 hours with 3.45 parts of sodium sand under 850 parts by volume of absolute ether. To the resulting thick suspension of sodio-malonic ester are added 13.7 parts of 1-methyl-4-phenyl-piperidine-4-carboxylic acid chloride-hydrochloride and the mixture stirred first at room temperature and finally at boiling temperature under reflux. After the addition of ice and 25 parts by volume of 5-normal hydrochloric acid, the ether layer is separated and the unreacted malonic ester contained therein recovered. To the aqueous layer ammonia is added, the precipitated [1-methyl - 4 - phenyl - piperidyl - (4)] - (dicarbethoxy-methyl) -ketone of the formula

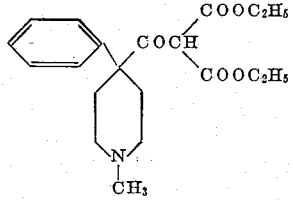

extracted with ether and converted into its hydrochloride with alcoholic hydrochloric acid, yielding, after recrystallization from methyl ethyl ketone, easily water soluble crystals of melting point 171–172° C. The free base is insoluble in water, but soluble in dilute alkali in which it is hydrolyzed on standing.

On heating the hydrochloride of the ketone thus obtained to boiling for several hours with 20 per cent hydrochloric acid, hydrolysis and carbon dioxide evolution take place. On evaporation to dryness the hydrochloride of 1-methyl-4-phenyl - piperidyl - (4)-methyl ketone of the formula

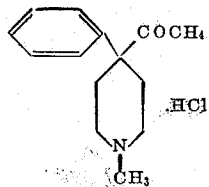

remains, which after recrystallization from alcohol melts at 240–242° C. The base obtained from the hydrochloride forms an oil boiling at 156–157° C. at 10 mm. which crystallizes in the cold and then melts at about 50° C.

The same end product is obtained, if instead of the tertiary acid chloride the corresponding quaternary compound such as the benzochloride is employed and the thus formed quaternary ketone converted to the tertiary product.

By starting with monomethylmalonic ester in the above example instead of malonic ester, 1-methyl-4-phenyl-piperidyl-ethyl ketone of the formula

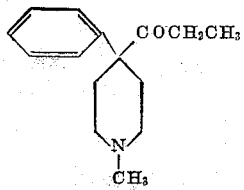

B. P. 158–160° C. at 10 mm. is obtained.

Example 2

5 parts of magnesium are reacted with 32 parts of malonic ester and 24 parts by volume of absolute alcohol with the addition of 0.5 part by volume of carbon tetrachloride and the thus formed magnesium compound dissolved in 80 parts by volume of absolute ether. To this is added a suspension of 27.4 parts of the hydrochloride of 1-methyl-4-phenyl-piperidine - 4 - carboxylic acid chloride in 100 parts by volume of ether, the whole stirred 2 hours at room temperature and then ½ hour at the boiling temperature of the ether. After decomposition with ice and 60 parts by volume of 5-normal hydrochloric acid the water layer is separated, the dissolved ether removed, the aqueous layer mixed with 120 parts by volume of concentrated hydrochloric acid and refluxed two hours. After partial evaporation the solution is neutralized with ammonia and cooled in ice. Some 1-methyl-4-phenyl-piperidine-4-carboxylic acid separates and is filtered off. On the further addition of ammonia, the 1-methyl-4-phenyl-piperidine-4 - methyl - ketone described in Example 1 precipitates. It is extracted with ether and dissolved in vacuo.

Example 3

3.45 parts of sodium sand in 200 parts by volume of isopropyl ether are reacted by stirring with 20 parts of acetoacetic ester. 13.7 parts of 1-methyl-4-phenyl-piperidine - 4-carboxylic acid chloride-hydrochloride are added and the mixture stirred first at room temperature and then at 50–60° C. After cooling, water is added, the ether layer separated and extracted with dilute hydrochloric acid. On the addition of ammonia to the acid solution, an oil is thrown out which is taken up in ether. The base remaining after the evaporation of the ether is neutralized with alcoholic hydrochloric acid, whereby the hydrochloride of [1-methyl-4-phenyl-piperidyl-(4)]-(acetyl-carbethoxymethyl) -ketone of the formula

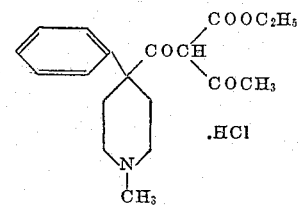

is obtained which on recrystallization from methylethyl ketone melts at 166–167° C.

Example 4

10 parts of 1-methyl-4-(m-methoxy-phenyl)-piperidine-4-carboxylic acid are refluxed with 50 parts by volume of ethyl acetate and 10 parts by volume of thionyl chloride. After about ½ hour all the material dissolves. On further heating, the hydrochloride of 1-methyl-4-(m-methoxy-phenyl)-piperidine-4-carboxylic acid chloride crystallizes out. It is filtered off, washed with ethyl acetate and dried in vacuo over sodium hydroxide.

To a solution of ethoxy-magnesium-malonic ester (prepared according to Example 2 from 2.5 parts of magnesium, 16 parts of malonic ester, 12 parts by volume of alcohol and 0.25 part of carbon tetrachloride in 40 parts by volume of ether) are added 15.2 parts of 1-methyl-4-(m - methoxy - phenyl) - piperidine - 4 - carboxylic acid chloride-hydrochloride. The mixture is heated ½ hour under reflux and the magnesium salt which separates as a crust is decomposed with ice and dilute hydrobromic acid. The solution remaining after the separation of the ether contains the hydrobromide of [1 - methyl - 4 - (m - methoxy - phenyl) - piperidyl - (4)] - (di - carbethoxy - methyl) - ketone of the formula

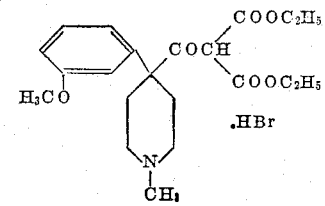

By the addition of ammonia the free base is separated as an oil.

An aqueous solution of the hydrobromide of [1 - methyl - 4 - (m - methoxy - phenyl) - piperidyl - (4) ] - (dicarbethoxy - methyl) - ketone is very strongly concentrated in vacuo and the residue refluxed with 75 parts by volume of hydrobromic acid, sp. gr. 1.5. The 1-methyl-4-(m - hydroxy - phenyl) - piperidine - 4 - carboxylic acid formed on neutralization with ammonia is filtered off and ammonia added in excess. After long standing in ice, the desired 1 - methyl - 4 - (m - hydroxy - phenyl) - piperidyl-(4)-methyl-ketone of the formula

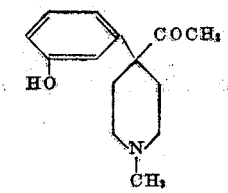

partially crystallizes and the remainder is recovered by extraction with chloroform. On crystallization from alcohol or ethyl acetate, the ketone is obtained as white crystals of melting point 158–159° C. which are difficultly soluble in water but easily soluble in dilute sodium hydroxide.

Example 5

1 - methyl - 4 - phenyl - piperidine - 4 - carboxylic acid chloride-hydrochloride is added to a solution of excess diazomethane in ether. When the evolution of nitrogen ceases, the ether is evaporated off and the residue of 1-methyl-4-phenyl - piperidyl - 4 - diazomethyl - ketone is dissolved in concentrated hydrochloric acid. After the ensuing reaction is completed the ether is evaporated. The residue is the hydrochloride of 1 - methyl - 4 - phenyl - piperidyl - (4) - chloromethyl ketone of the formula

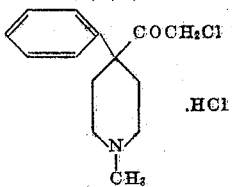

This is hydrogenated in alcoholic solution to which is added sodium hydroxide and palladium black. From the reaction mixture the 1-methyl-4 - phenyl - piperidyl - (4) - methyl - ketone described in Example 1 is isolated.

If the diazoketone is treated with an organic acid instead of hydrochloric acid, the corresponding ester of the hydroxy ketone is obtained.

Example 6

6.9 parts of pulverized sodium are caused to react in ether with 56.4 parts of ethyl-malonic acid-diethylester. When the sodium salt has formed, 30.4 parts of 1-methyl-4-(meta-methoxyphenyl)-piperidine-4-carboxylic acid chloride-hydrochloride are added and the whole is stirred for several hours. Ice is added to cause decomposition and hydrochloric acid in order to acidify the whole. An addition of sodium carbonate will precipitate [1 - methyl - 4 - (meta-methoxy-phenyl) - piperidyl - (4) ] - (α:α - dicarbethoxy-propyl)-ketone of the formula

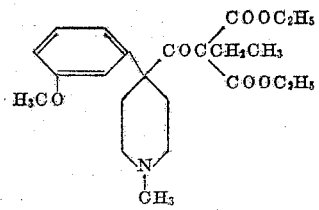

in the form of an oil. This oil is taken up with ether and, after evaporation of the latter, is saponified with hydrobromic acid and decarboxylated. 1 - methyl - 4 - (meta - hydroxyphenyl) - piperidyl - (4) - n - propyl - ketone of the formula

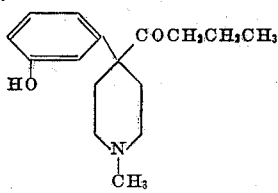

melting at 153–154° C. is thus obtained. Its hydrochloride melts at 140–142° C. By acetylating the base 1 - methyl - 4 - (meta - acetoxyphenyl) - piperidyl - (4) - n - propyl - ketone is obtained, the hydrochloride of which melts at 172–174° C.

Example 7

7.5 parts of pulverized sodamide under 250 parts by volume of absolute ether are caused to react with 21 parts of benzylcyanide. Then, while cooling with ice, 16 parts of 1-methyl-4-(meta - methoxy - phenyl) - piperidine - 4 - carboxylic acid chloride-hydrochloride are added and the whole is stirred for one hour. After decomposition has taken place through the addition of ice, the ethereal layer is separated and the aqueous portion is mixed with ammonium chloride. The precipitated flakes are separated by filtering with suction, dried and recrystallized from ethyl acetate. [1-methyl-4-(meta-methoxy - phenyl) - piperidyl - (4) ] - (α - cyanobenzyl)-ketone of the formula

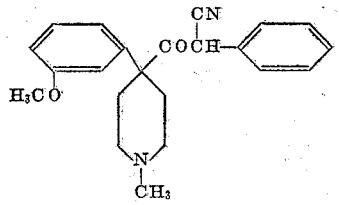

is thus obtained as a yellowish crystal-powder of melting point 116.5–118° C.

This substance, if boiled with hydrobromic acid, becomes 1 - methyl - 4 - (meta - hydroxyphenyl) - piperidyl - (4) - benzyl - ketone of the formula

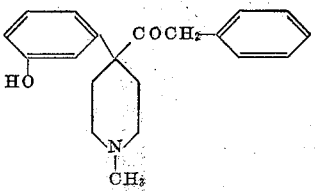

which is obtained from alcohol in colorless crystals melting at 187–188° C.

Example 8

16 parts of 1 - methyl - 4 - (meta - methoxyphenyl)-piperidine-4-carboxylic acid chloride-hydrochloride are poured in portions into a solution of diazomethane in methylene chloride, obtained from 28 parts of nitrosomethylurea. When the reaction has taken place, the methylene chloride solution is washed with ice-cold dilute caustic soda solution and with ice water, dried and evaporated. There remains a semicrystalline residue. When the latter is flooded with 5 N hydrochloric acid and slightly warmed it dissolves and generates plenty of nitrogen. The solution is treated with carbon and evaporated. The glassy residue dissolves in acetone and fine crystals of 1 - methyl - 4 - (meta-methoxy - phenyl) - piperidyl - (4) - chloromethyl-ketone-hydrochloride of the formula

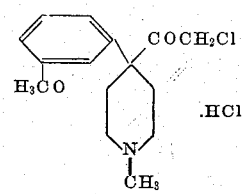

separate from this solution when allowed to stand. They melt at 170–173° C. By dehalogenation with palladium and hydrogen and subsequent saponication with hydrogen bromide, the 1 - methyl - 4 - (meta - hydroxy - phenyl)-piperidyl - (4) - methylketone described in Example 4 is obtained.

What is claimed is:

1. In a process for the preparation of a piperidyl alkyl ketone which corresponds to the formula

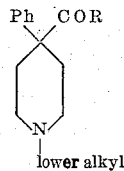

wherein Ph stands for a phenyl radical, and R stands for a member selected from the group consisting of lower alkyl and aralkyl radicals, the step of reacting a salt of a tertiary 1-lower-alkyl-4 - phenyl - piperidine - 4 - carboxylic acid halide with an active methylene compound containing, as activating group, a member selected from the class consisting of the diazo, carbalkoxy, acetyl and nitrile groups, the methylene compound in the case of the last three enumerated groups being reacted in the form of a metal derivative, whereby a 1-lower-alkyl-4-phenyl-piperidyl-4-ketone is formed.

2. In a process for the preparation of a piperidyl alkyl ketone which corresponds to the formula

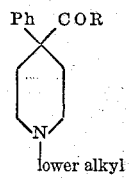

wherein Ph stands for a phenyl radical, and R stands for an alkyl group, the step of reacting a salt of a tertiary 1-lower-alkyl-4-phenyl-piperidine-4-carboxylic acid halide with an active methylene compound containing a diazo group as activating group, whereby a 1-lower-alkyl-4-phenyl-piperidyl-4-ketone is formed.

3. In a process for the preparation of a piperidyl alkyl ketone which corresponds to the formula

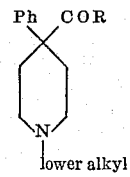

wherein Ph stands for a phenyl radical, and R stands for an alkyl group, the step of reacting a salt of a tertiary 1-lower-alkyl-4-phenyl-piperidine-4-carboxylic acid halide with a metal derivative of an active methylene compound containing an esterified carboxyl group as activating group, whereby a 1-lower-alkyl-4-phenyl-piperidyl-4-ketone is formed.

4. In a process for the preparation of a piperidyl alkyl ketone which corresponds to the formula

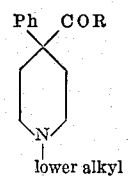

wherein Ph stands for a phenyl radical, and R stands for an aralkyl group, the step of reacting a salt of a tertiary 1-lower-alkyl-4-phenyl-piperidine-4-carboxylic acid halide with a metal derivative of an active methylene compound containing a nitrile group as activating group, whereby a 1-lower-alkyl-4-phenyl-piperidyl-4-ketone is formed.

5. In a process for the preparation of a piperidyl alkyl ketone which corresponds to the formula

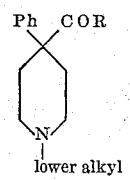

wherein Ph stands for a phenyl radical, and R stands for an alkyl group, the step of reacting a salt of a tertiary 1-lower-alkyl-4-phenyl-piperidine-4-carboxylic acid halide with an alkali metal derivative of an active methylene compound containing an esterified carboxyl group as activating group, whereby a 1-lower-alkyl-4-phenyl-piperidyl-4-ketone is formed.

6. In a process for the preparation of a piperidyl alkyl ketone which corresponds to the formula

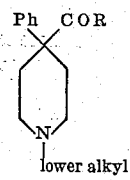

wherein Ph stands for a phenyl radical, and R stands for an alkyl group, the step of reacting a salt of a tertiary 1-lower-alkyl-4-phenyl-piperidine-4-carboxylic acid halide with the sodium derivative of an active methylene compound containing an esterified carboxyl group as activating group, whereby a 1-lower-alkyl - 4 - phenyl-piperidyl-4-ketone is formed.

7. In a process for the preparation of a piperidyl alkyl ketone which corresponds to the formula

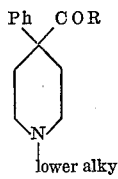

wherein Ph stands for a phenyl radical, and R stands for an alkyl group, the step of reacting a salt of a tertiary 1-lower-alkyl-4-phenyl-piperidine-4-carboxylic acid halide with the alkoxy-magnesium derivative of an active methylene compound containing an esterified carboxyl group as activating group, whereby a 1-lower-alkyl-4-phenyl-piperidyl-4-ketone is formed.

8. In a process for preparing 1-methyl-4-phenyl-piperidyl-(4)-methyl-ketone the step of reacting 1-methyl-4 - phenyl-piperidine-4 - carboxylic acid chloride hydrochloride with the sodium salt of ethyl malonate.

9. In a process for preparing 1-methyl-4-(m-hydroxy-phenyl)-piperidyl - (4)-methyl - ketone, the step of reacting 1-methyl-4-(m-methoxy-phenyl)-piperidine-4-carboxylic acid chloride-hydrochloride with the ethoxy-magnesium salt of ethyl malonate.

10. In a process for preparing an alkyl piperidyl ketone which comprises reacting a salt of a tertiary 4-phenyl-piperidine-4-carboxylic acid halide with an aliphatic diazo compound.

11. A 4-phenyl-piperidyl - (4) - alkyl - ketone which corresponds to the formula

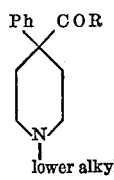

wherein Ph stands for a phenyl nucleus, and R stands for a member selected from the group consisting of alkyl and aralkyl radicals, which contains in α-position to the keto group a substituent selected from the class consisting of carbalkoxy, acyl of the formula

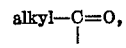

halogen and nitrile groups.

12. A 1-alkyl-4-phenyl-piperidyl-(4) (α,α-dicarboxy-methyl)-ketone ester.

13. The [1-methyl-4-phenyl - piperidyl - (4)]-(dicarbethoxy-methyl)-ketone.

14. The [1 - methyl-4-(m-methoxy - phenyl)-piperidyl-(4)]-(dicarbethoxy-methyl)-ketone.

15. The [1-methyl-4-phenyl - piperidyl - (4)]-(acetyl-carbethoxy-methyl)-ketone.

16. The 1-methyl-4 - (m-methoxy-phenyl)- piperidyl-(4)-chlormethyl-ketone.

HANS KAEGI.
KARL MIESCHER.

REFERENCES CITED

The following references are of record in the file of this patent:

UNITED STATES PATENTS

| Number | Name | Date |
|---|---|---|
| 2,200,306 | Schneider et al. | May 14, 1940 |
| 2,248,018 | Eisleb | July 1, 1941 |
| 2,421,729 | Walton et al. | June 3, 1947 |

OTHER REFERENCES

Jensen et al.: Dansk Tidskrift f. Formaci, vol. 17, pp. 173–174 (1934).

Mannich: Chem. Abstr., vol. 28, page 4061 (1934).

Blicke et al.: Jour. Amer. Chem. Soc., vol. 66, p. 1088 (1944).

Koelsch: Jour. Org. Chem., vol. 10, pages 34–41 (1945).

Schaumann: Archiv. fur Exp. Path. Pharm., vol. 196, pp. 127–129.